United States Patent
Boss et al.

(10) Patent No.: US 11,459,028 B2
(45) Date of Patent: Oct. 4, 2022

(54) ADJUSTING VEHICLE SENSITIVITY

(71) Applicant: KYNDRYL, INC., New York, NY (US)

(72) Inventors: Gregory J. Boss, Saginaw, MI (US); Michael Bender, Rye Brook, NY (US); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 294 days.

(21) Appl. No.: 16/568,958

(22) Filed: Sep. 12, 2019

(65) Prior Publication Data

US 2021/0078629 A1 Mar. 18, 2021

(51) Int. Cl.
- *B62D 6/00* (2006.01)
- *G07C 5/08* (2006.01)
- *B60W 50/00* (2006.01)

(52) U.S. Cl.
CPC ........... *B62D 6/00* (2013.01); *B60W 50/0098* (2013.01); *B62D 6/007* (2013.01); *G07C 5/085* (2013.01);
(Continued)

(58) Field of Classification Search
CPC ..... B60W 50/0098; B60W 2050/0082; B60W 40/10; B60W 60/005; G07C 5/0816;
(Continued)

(56) References Cited

U.S. PATENT DOCUMENTS 8,260,515 B2    9/2012   Huang
8,352,112 B2 *   1/2013   Mudalige ............... G08G 1/163
                                            342/458

(Continued)

FOREIGN PATENT DOCUMENTS

CN           107415871 A      12/2017
DE     102013016488 A1      4/2015
(Continued)

OTHER PUBLICATIONS

S. Wei, Y. Zou, X. Zhang, T. Zhang and X. Li, "An Integrated Longitudinal and Lateral Vehicle Following Control System With Radar and Vehicle-to-Vehicle Communication," in IEEE Transactions on Vehicular Technology, vol. 68, No. 2, pp. 1116-1127, Feb. 2019, doi: 10.1109/TVT.2018.2890418.*

(Continued)

*Primary Examiner* — Cuong H Nguyen
(74) *Attorney, Agent, or Firm* — Erik Swanson; Andrew M. Calderon; Roberts Calderon Safran & Cole, P.C.

(57) ABSTRACT

One example of a computer-implemented method of adjusting vehicle sensitivity comprises receiving, at a first vehicle, a vehicle profile of a second vehicle. The vehicle profile of the second vehicle correlates measured responses of one or more actuators on the second vehicle to measured user control inputs on the second vehicle. The method further comprises receiving a user control input for the first vehicle; and modifying a response of one or more actuators on the first vehicle to the received user control input based on the received vehicle profile of the second vehicle such that the one or more actuators on the first vehicle mimic the one or more actuators on the second vehicle.

20 Claims, 3 Drawing Sheets

(52) U.S. Cl.
CPC ... *G07C 5/0816* (2013.01); *B60W 2050/0082* (2013.01)

(58) Field of Classification Search
CPC .......... G07C 5/085; B62D 6/007; B62D 6/00; G08G 1/096791
USPC .......................................... 701/29.3, 36, 42
See application file for complete search history.

(56) References Cited

U.S. PATENT DOCUMENTS

| | | | | |
|---|---|---|---|---|
| 8,862,384 | B2* | 10/2014 | Stahlin | H04L 67/12 |
| | | | | 701/400 |
| 9,073,555 | B2 | 7/2015 | Otanez | |
| 9,117,371 | B2* | 8/2015 | Hutchings | G08G 1/096791 |
| 9,176,924 | B2* | 11/2015 | Ricci | G06F 3/017 |
| 9,288,270 | B1 | 3/2016 | Penilla | |
| 9,754,325 | B1* | 9/2017 | Konrardy | G08G 1/005 |
| 9,921,581 | B2* | 3/2018 | Tseng | H04W 4/02 |
| 9,946,531 | B1* | 4/2018 | Fields | G06Q 40/08 |
| 10,023,114 | B2* | 7/2018 | Adams | B60Q 9/00 |
| 10,217,358 | B2* | 2/2019 | Zydek | G08G 1/096775 |
| 10,399,493 | B2* | 9/2019 | Adams | G07C 5/0825 |
| 10,719,886 | B1* | 7/2020 | Konrardy | G07C 5/085 |
| 11,017,553 | B2* | 5/2021 | Nasu | G06V 20/54 |
| 11,024,167 | B2* | 6/2021 | Kanehara | G08G 1/0112 |
| 11,036,370 | B2* | 6/2021 | Adenwala | H04W 4/026 |
| 11,163,317 | B2* | 11/2021 | Kelkar | G01S 5/0072 |
| 2010/0087987 | A1 | 4/2010 | Huang | |
| 2015/0254781 | A1* | 9/2015 | Binion | B60R 21/00 |
| | | | | 701/32.2 |
| 2015/0266468 | A1* | 9/2015 | Moon | B60W 20/40 |
| | | | | 180/65.265 |
| 2015/0291146 | A1 | 10/2015 | Prakah-Asante | |
| 2016/0026182 | A1 | 1/2016 | Boroditsky | |
| 2017/0021764 | A1* | 1/2017 | Adams | G06Q 40/08 |
| 2017/0046885 | A1 | 2/2017 | Marathe | |
| 2017/0243485 | A1* | 8/2017 | Rubin | H04W 4/12 |
| 2017/0278390 | A1* | 9/2017 | Zydek | B60W 30/00 |
| 2018/0053102 | A1 | 2/2018 | Martinson | |
| 2018/0141568 | A1* | 5/2018 | Singhal | B60W 10/08 |
| 2018/0233040 | A1* | 8/2018 | Zydek | B60W 30/00 |
| 2018/0339653 | A1* | 11/2018 | Adams | G07C 5/0825 |
| 2019/0009785 | A1* | 1/2019 | Lawrenson | G01S 17/66 |
| 2019/0243381 | A1* | 8/2019 | Strunck | G08G 1/096791 |
| 2019/0354101 | A1* | 11/2019 | Sujan | B60W 60/005 |
| 2020/0042017 | A1* | 2/2020 | Kelkar | G01S 5/0072 |
| 2020/0219070 | A1* | 7/2020 | Rosenzweig | G06N 5/04 |
| 2020/0312155 | A1* | 10/2020 | Kelkar | B60W 60/005 |

FOREIGN PATENT DOCUMENTS

| | | | | |
|---|---|---|---|---|
| SE | 538817 C2 | * | 10/2016 | ............ B60W 30/16 |
| SE | 1550389 A1 | * | 10/2016 | ............ B60W 30/16 |
| WO | 2017141161 A1 | | 8/2017 | |

OTHER PUBLICATIONS

L. Alouache, N. Nguyen, M. Aliouat and R. Chelouah, "Toward a hybrid SDN architecture for V2V communication in IoV environment," 2018 Fifth International Conference on Software Defined Systems (SDS), 2018, pp. 93-99, doi: 10.1109/SDS.2018.8370428.*

Vladimir vUkadinovic et al. "3GPP C-V2X and IEEE 802.11 p for Vehicle-to-Vehicle communications in highway platooning scenarios", Available online Mar. 15, 2018.*

D. Jia, K. Lu, J. Wang, X. Zhang and X. Shen, "A Survey on Platoon-Based Vehicular Cyber-Physical Systems," in IEEE Comm. Surveys & Tutorials, vol. 18, No. 1, pp. 263-284, Firstquarter2016, doi: 10.1109/COMST.2015.2410831. (Year: 2016).*

V. Milanés, S. E. Shladover, J. Spring, C. Nowakowski, H. Kawazoe and M. Nakamura, "Cooperative Adaptive Cruise Control in Real Traffic Situations," in IEEE Transactions on Intelligent Transportation Systems, vol. 15, No. 1, pp. 296-305, Feb. 2014, doi: 10.1109/TITS.2013.2278494. (Year: 2014).*

V. Turri, B. Besselinkand K. H. Johansson, "Cooperative Look-Ahead Control for Fuel-Efficient and Safe Heavy-Duty Vehicle Platooning," in IEEE Transactions on Control Systems Technology, vol. 25, No. 1, pp. 12-28, Jan. 2017, doi: 10.1109/TCST.2016.2542044. (Year: 2017).*

K. Yu et al., "Model Predictive Control for Hybrid Electric Vehicle Platooning Using Slope Information," in IEEE Transactions on Intelligent Transportation Systems, vol. 17, No. 7, pp. 1894-1909, Jul. 2016, doi: 10.1109/TITS.2015.2513766. (Year: 2016).*

D. Perez et al., "Solving the Physical Traveling Salesman Problem: Tree Search and Macro Actions," in IEEE Transactions on Computational Intelligence and AI in Games, vol. 6, No. 1, pp. 31-45, Mar. 2014, doi: 10.1109/TCIAIG.2013.2263884 (Year: 2014).*

E. J. Powley, D. Whitehouse, and P. I. Cowling, "Monte Carlo tree search with macro-actions and heuristic route planning for the physical travelling salesman problem," in Proc. IEEE Conf. Comput. Intell. Games, 2012, pp. 234-241 (Year: 2012).*

D. Perez, P. Rohlfshagen, and S. Lucas, "Monte Carlo tree search: Long term versus short term planning," in Proc. IEEE Conf. Comput. Intell.Games, 2012, pp. 219-226. (Year: 2012).*

Wang et al., "Modeling and Recognizing Driver Behavior Based on Driving Data: A Survey," Mathematical Problems in Engineering, vol. 2014, Article ID 245641, Feb. 10, 2014, 20 pages. <https://www.hindawi.com/journals/mpe/2014/245641/>.

* cited by examiner

ADJUSTING VEHICLE SENSITIVITY

BACKGROUND

There are many different makes and models of vehicles. Each make and model of a vehicle may handle differently. Indeed, even among the same make and model, vehicles may handle differently based on age, condition, etc. When a user/driver switches from one vehicle to another, the difference in responsiveness of the vehicles can make it difficult for the driver to adapt and can lead to safety concerns, such as braking too quickly or too slowly.

SUMMARY

Aspects of the disclosure may include a computer-implemented method, computer program product, and system of adjusting vehicle sensitivity. One example of the computer-implemented method comprises receiving, at a first vehicle, a vehicle profile of a second vehicle. The vehicle profile of the second vehicle correlates measured responses of one or more actuators on the second vehicle to measured user control inputs on the second vehicle. The method further comprises receiving a user control input for the first vehicle; and modifying a response of one or more actuators on the first vehicle to the received user control input based on the received vehicle profile of the second vehicle such that the one or more actuators on the first vehicle mimic the one or more actuators on the second vehicle.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below enable vehicles to adjust the sensitivity of user control inputs such that a first vehicle is able to approximate the responsiveness of a second different vehicle. In particular, through embodiments described herein a car's handling dynamics and responsiveness can be modified to match the desires or needs of a specific driver. For example, a driver may be accustomed to driving a first vehicle having a certain responsiveness for braking, steering, and/or acceleration. Conventionally, when attempting to drive a second different vehicle, that same driver must adapt to the responsiveness of the second vehicle. However, through the embodiments described herein, the second vehicle can be adapted to approximate the responsiveness of the first vehicle. Thus, the driver does not need to adapt to the second vehicle. Furthermore, in situations involving new drivers learning to drive, such as in a driver education class, a new driver may be assigned to drive different vehicles during the training, each vehicle having its own responsiveness. This can make it more difficult for the new driver to learn how to drive. However, through the embodiments described herein, each of the vehicles can be adapted to have approximately the same responsiveness regardless of the make or model of the vehicles which will decrease the difficulty or confusion for the new driver in learning to drive. Furthermore, in some embodiments, the system is able to detect possible maintenance or repair items based on monitoring the needed modifications to the vehicle responsiveness.

Figure 1:
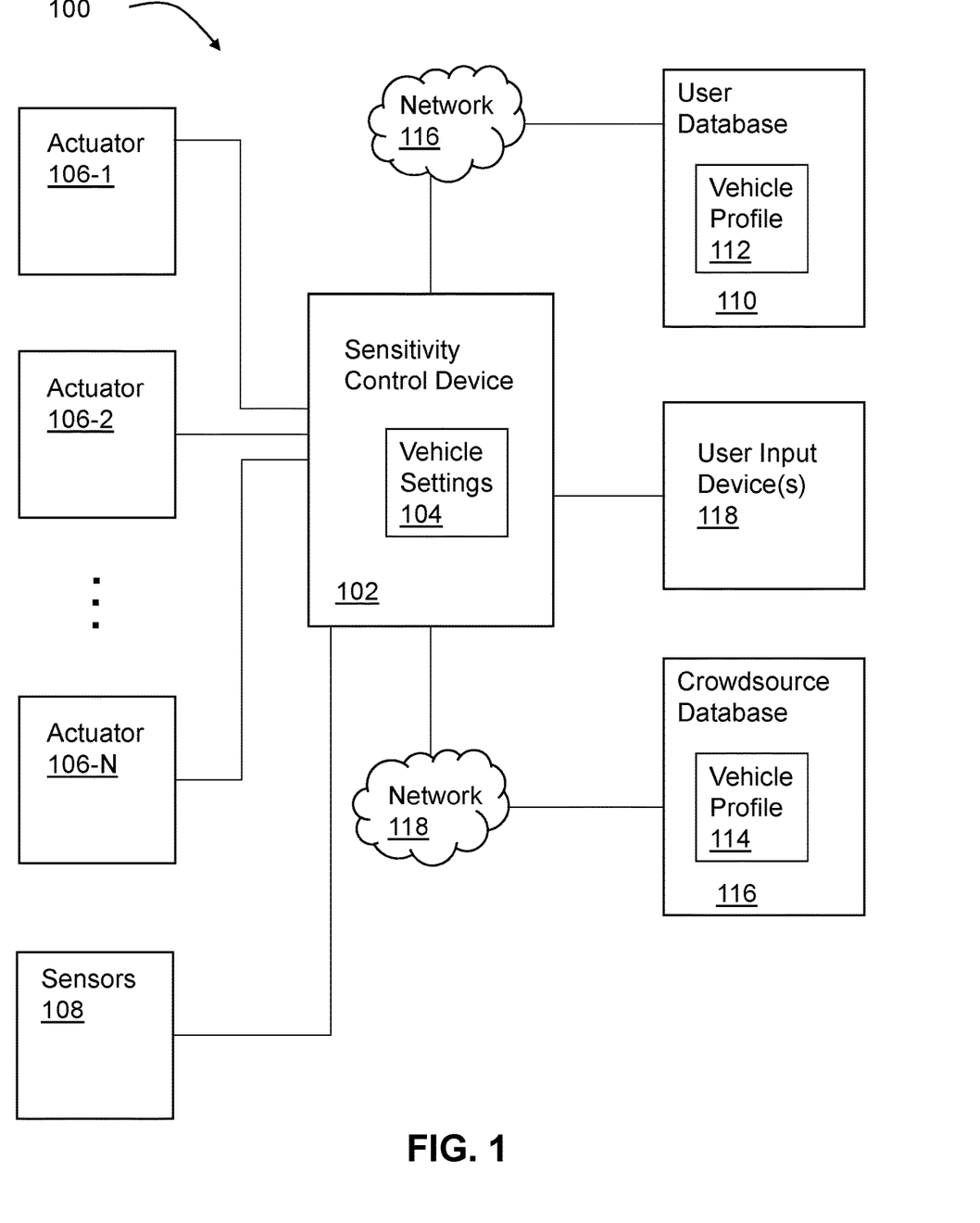
FIG. 1 is a high-level block diagram of one embodiment of an example system for adjusting vehicle sensitivity.

FIG. 1 is a high-level block diagram of one embodiment of a system 100 for adjusting vehicle sensitivity or responsiveness. The system 100 includes a sensitivity control device 102, a plurality of actuators 106-1 ... 106-N (where N is the total number of actuators), one or more sensors 108, and one or more user input devices 118. The sensitivity control device 102 is coupled to the actuators 106-1 ... 106-N, the sensors 108, and the one or more user input devices 118 via a local wired and/or wireless network. For example, the sensitivity control device 102 can be coupled to the actuators 106-1 ... 106-N, the sensors 108, and the user input devices 118 via a Controller Area Network (CAN) bus. As used herein, Controller Area Network refers to an implementation of one or more of the ISO 11898/11519 families of standards. Furthermore, it is to be understood that other network protocols can be used in other embodiments.

The actuators 106-1 ... 106-N (collectively referred to herein as actuators 106) can include actuators for braking, steering, and accelerating, etc. As understood by one of skill in the art, an actuator is a component responsible for causing a machine or device to operate. Thus, a braking actuator causes the brakes to operate, a steering actuator causes the wheels to turn, etc. The sensitivity control device 102 is configured to send signals to the actuators 106 to modify a response of the actuators 106 to user input control signals. User input controls are provided through common user input control devices for driving a vehicle. As understood by one of skill in the art, the user input control devices 118 can include, but are not limited to, a steering wheel, a brake pedal, and an acceleration pedal. Other example user input control devices 118 can include a horn or a gear stick/lever. For example, if a user presses down on a brake pedal, the sensitivity control device 102 sends a signal to one or more braking actuators to control a braking force, such as, but not limited to, through the use of disc brakes or drum brakes. The sensitivity control device 102 controls the amount of braking force applied by the braking actuators based on the user input and the vehicle settings 104. For example, in response to a user depressing the brake pedal 1 inch, the sensitivity control device 102 causes the braking actuators to apply a certain amount of braking force which will result in a desired braking response (e.g. braking distance, decrease in speed, etc.) based on the vehicle settings 104.

The vehicle settings 104 can include a table, algorithm, or other means of correlating the amount of user input (e.g.

amount of displacement of a braking pedal, displacement of an acceleration pedal, or degrees of rotation of a steering wheel, etc.) with a response of the corresponding actuators. The sensitivity control device 102 is configured to update the vehicle settings 104 to approximate a response of a different vehicle. For example, in some embodiments, the sensitivity control device 102 is coupled to a user database 110 which stores one or more vehicle profiles 112. The sensitivity control device 102 updates the vehicle settings 104 based on the vehicle profile 112.

In the example shown in FIG. 1, the sensitivity control device 102 is coupled to the user database 110 via a network 116. The network 116 can be a local area network, in some embodiments. For example, in some embodiments, the user database 110 comprises an internal memory device located onboard the vehicle. In such embodiments, a user can store the vehicle profile 112 on the user database 110 for retrieval by the sensitivity control device 102. For example, the user can transfer the vehicle profile 112 from a portable media storage device, such as a portable flash storage drive, to the user database 110.

In other embodiments, the user database 110 is a portable media storage device which can be coupled to the sensitivity control device 102 via a port on the vehicle enabling connection of the portable media storage device with the network 116. Thus, in such embodiments, the system 100 does not need to store the vehicle profile 112 on an internal memory device. In some embodiments, the user database 110 is a part of a user's mobile device such as a smart phone, tablet, or wearable device having memory for storing the vehicle profile 112. In some such embodiments, the network 116 can be implemented as a short-range wireless network. For example, network 116 can be implemented using a Near-Field Communication (NFC) protocol or other wireless technology, such as Bluetooth® technology developed and maintained by Bluetooth SIG, Inc. In yet other embodiments, the network 116 can include a wide area network, such as the internet. For example, the sensitivity control device 102 can be communicatively coupled to the user database 110 via the internet using a cellular network in some embodiments.

The sensitivity control device 102 is configured to modify the vehicle settings 104 based on the vehicle profile 112 retrieved from the user database 110. In particular, the vehicle profile 112 can include data correlating the amount of user input with a response of the corresponding actuators for a second different vehicle. For example, the vehicle profile 112 can include a table, algorithm, or other means of correlating the amount of user input (e.g. amount of displacement of a braking pedal, displacement of an acceleration pedal, or degrees of rotation of a steering wheel, etc.) with a response of the corresponding actuators. In this way, the sensitivity control device 102 can modify the vehicle settings 104 based on the vehicle profile 112 of the second vehicle such that sensitivity control device 102 causes the actuators 106 to respond to user control inputs in approximately the same manner as the second vehicle. For example, the actuators 106 of system 100 may initially correlate a 1 inch displacement of the acceleration pedal with a first acceleration rate whereas a second vehicle provides the same first acceleration rate with a 2 inch displacement of the acceleration pedal. Thus, based on the vehicle profile 112, the sensitivity control device 102 modifies the response of the actuators 106 to provide the first acceleration rate in response to a 2 inch displacement of the acceleration pedal similar to the second vehicle. Thus, through the use of the vehicle profile 112 and the sensitivity control device 102, the system 100 enables the actuators 106 to mimic the response of corresponding actuators of a different vehicle.

Additionally, the sensors 108 are configured to measure user input and the corresponding response of actuators 106. For example, the sensors 108 can measure the amount a steering wheel is rotated and the corresponding amount the wheels are turned (i.e. the steering ratio). Thus, the sensors 108 can include pressure sensors, accelerometers, gyroscopes, or other appropriate sensor for measuring user input and the corresponding response of the actuators 106. The measured user input and corresponding response of actuators 106 can be stored to a vehicle profile for the vehicle on which the actuators 100 are located. The vehicle profile can then be used by a different vehicle to approximate the responsiveness of the actuators 106 in system 100. In other words, in such embodiments, rather than importing a vehicle profile, the system 100 can export a vehicle profile to be used on another vehicle. Thus, a user which switches from one vehicle to another can experience similar responsiveness from each vehicle regardless of the vehicle make, model, etc. In this way, the user can have a similar driving experience from vehicle to vehicle rather than having to learn or adapt to the varied responsiveness among different vehicles.

In some embodiments, the system 100 is configured to detect the current driver, such as through sensors 108 and to automatically load a preferred vehicle profile designated by the current driver. For example, the sensors 108 can include cameras and the sensitivity control device 102 or another component of system 100 can be configured to perform image analysis to identify the current driver. Alternatively, the current driver can be identified using biometric sensors, such as, for example, fingerprint scanners. Furthermore, in some embodiments, prior to loading a preferred vehicle profile, the sensitivity control device 102 or another component of system 100 can output a prompt to the detected driver requesting confirmation that the driver wants to load the preferred vehicle profile. For example, the prompt can be an audio prompt and the driver can respond with a spoken command/confirmation. Alternatively, the prompt can be displayed on a display in the vehicle and the driver can provide confirmation or change to the profile by manipulating input elements associated with the display.

Additionally, in some embodiments, a vehicle profile is not loaded unless the driver selects a profile otherwise initiates the loading of the vehicle profile. For example, the driver can issue a voice command or use input elements associated with a display to select a vehicle profile to be loaded. Furthermore, it is to be understood that, in some embodiments, more than one vehicle profile can be available for selecting. For example, vehicle profiles for multiple vehicles driven by the current driver can be stored for selection. That is, a driver may drive a first, second, and third vehicle, each of which includes a vehicle sensitivity system such as system 100. Thus, each of the three vehicles records the initial or native responsiveness (e.g. unmodified responsiveness) of the respective vehicle as it is driven and store characteristics in a respective profile. The driver can then store each of the three profiles on a user database 110 which is accessible by the vehicles. In this way, the user can select the vehicle profile to be applied when driving any of the three vehicles.

In addition, in some embodiments, the sensitivity control device 102 can be communicatively coupled to a crowd-source database 116 in addition to or in lieu of the user database 110. Thus, in some embodiments, only the user database 110 is used. In other embodiments, only the crowd-source database 116 is used. In yet other embodiments, both the user database 110 and the crowdsource database 116 are used. The crowdsource database 116 is coupled to the sensitivity control device 102 via a network 118. For example, the network 118 can be a wide area network, such as the internet, which can be accessed via a cellular network connection on the vehicle. The crowdsource database 116 stores one or more vehicle profiles 114. The profile 114 includes data similar to data stored in vehicle profile 112 stored on user database 110. For example, both vehicle profile 112 and vehicle profile 114 can include characteristics correlating user input measurements with measured responses by actuators of the vehicle.

In some embodiments, the vehicle profile 114 can represent an average of similar vehicles as opposed to a profile of a specific single vehicle. For example, the vehicle profile 114 can include average responses to measured user input for a plurality of vehicle that are the same make and model. Additionally, in some embodiments, the vehicle profile 114 can represent an average of different makes of vehicles but that are similar in size, age, etc. Additionally, in some embodiments, the condition of the vehicle is used in selecting vehicles for inclusion in the average. For example, in some such embodiments, a given make and model of a vehicle can have multiple vehicle profiles (e.g. one profile for new condition, one for good condition, one for poor condition, etc.). Additionally, the vehicle profile can be based on information such as miles driven, routine maintenance performed, type and age of tires, etc. Thus, a user can select a vehicle profile which most closely matches the vehicle whose response is to be matched.

One example use case for vehicle profiles 114 from crowdsource database 116 is when a vehicle profile for a specific single vehicle is not available. For example, if the user/driver desires to match the characteristics of the user's personal vehicle but a profile for the user's vehicle is not available, then the user can select a crowdsourced vehicle profile 114 from the crowdsource database 116. Thus, in some embodiments, a user can also opt into sharing measured data from sensors 108 with the crowdsource database 116 to aid in building the crowdsource vehicle profile 114 together with measured data from other vehicles.

Another example use case for the crowdsourced vehicle profiles 114 is for aid in detecting maintenance needs. In particular, the sensitivity control device 102 is configured, in some embodiments, to monitor changes in the modifications to the actuators to achieve the desired responsiveness. In particular, the sensitivity control device 102 is configured, in some embodiments, to monitor the response of the actuators 106 to user input through sensors 108. The sensors 108 provide information indicating changes in the amount of user input (e.g. amount a pedal is depressed) to provide the same vehicle response (e.g. braking time or braking distance) For example, if the amount of braking force required to achieve the desired braking distance for a given displacement of the brake pedal changes over time, the sensitivity control 102 can indicate to the user that maintenance may be needed on the braking system. The decision can be based on detecting that the change in the amount of braking force has passed a predetermined threshold. Similar determinations can be made on the steering and acceleration mechanisms. In addition, it is to be understood that the specific vehicle profile 112 in user database 110 that is not crowdsourced can also be used in addition to or in lieu of the crowdsourced vehicle profile 114 for detecting maintenance recommendations.

Furthermore, in some embodiments, a maintenance/repair recommendation can be determined based on a comparison of the vehicle's native responsiveness to a crowdsourced vehicle profile 114 for the same make and model of the vehicle. In other words, a vehicle having a first make, first model, etc. can be compared to a crowdsourced profile 114 for vehicles of the first make and first model. In this way, if the vehicle's responsiveness deviates from the crowdsourced average responsiveness by a predetermined amount or percentage, for example, then a maintenance/repair recommendation is provided to the user in some embodiments.

In addition, in some embodiments the data included in the vehicle profiles 112 or crowdsourced vehicle profiles 114 include data on weather and/or road conditions. For example, in some embodiments, the sensors 108 include one or more sensors for measuring road and/or weather conditions, such as, but not limited to, thermometers, moisture sensors, accelerometers, etc. Such sensors can detect bumpy roads, slick road conditions, temperature of the ambient environment as well as the temperature of the engine, etc. This weather and/or road condition data can be correlated to the responsiveness of the actuators 106 in different environmental conditions and stored in the corresponding vehicle profile. Thus, through the use of the weather and/or road condition data, the sensitivity control device 102 is able to more accurately control the responsiveness of the actuators 106 to mimic the response of the vehicle corresponding to the loaded vehicle profile.

Figure 2:
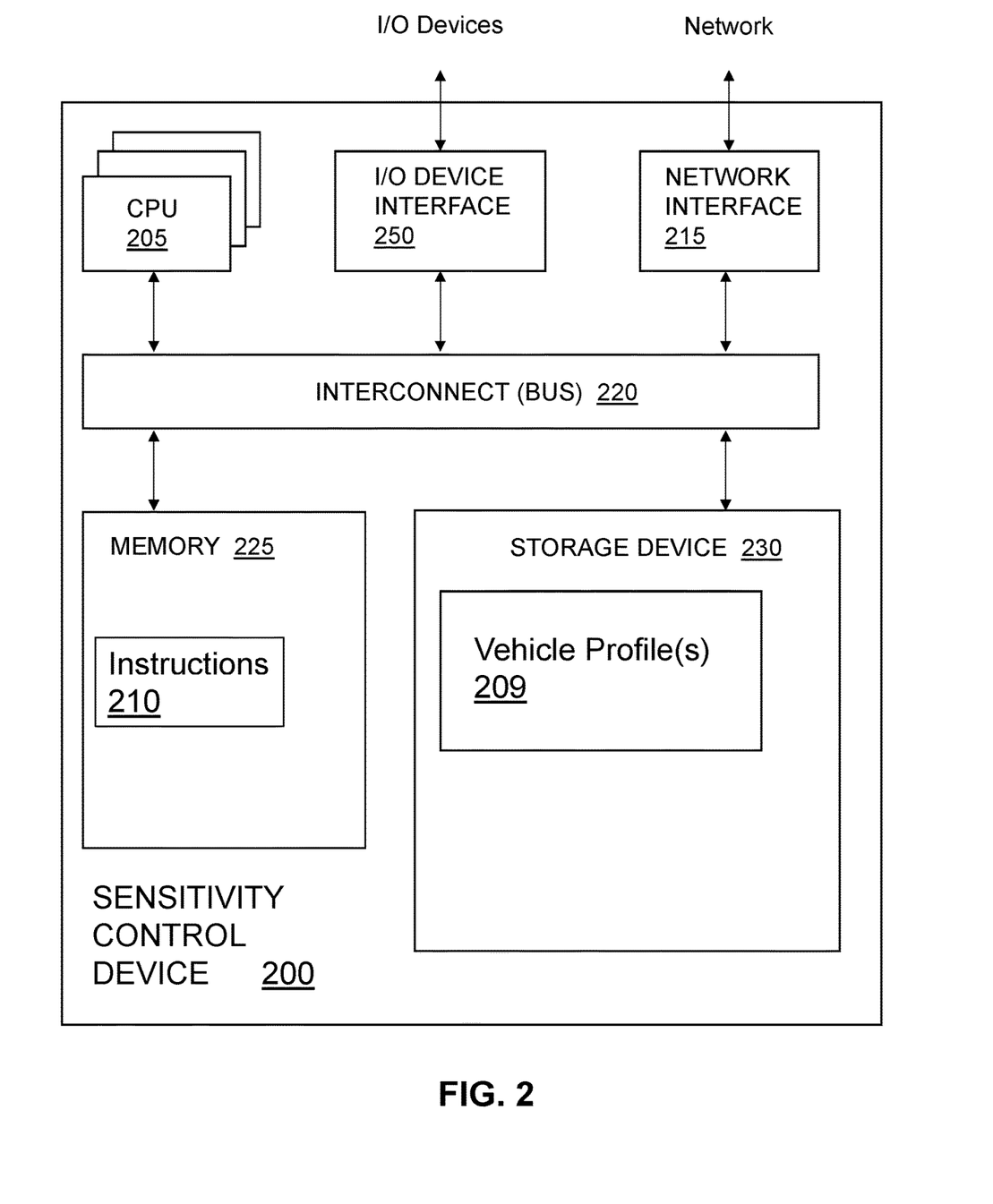
FIG. 2 is a high-level block diagram of one embodiment of an example sensitivity control device.

FIG. 2. is a FIG. 2 is a high-level block diagram of one embodiment of an example sensitivity control device 200. The sensitivity control device 200 can be implemented as sensitivity control device 102 in FIG. 1. In the example shown in FIG. 2, the sensitivity control device 200 includes a memory 225, storage 230, an interconnect (e.g., BUS) 220, one or more processors 205 (also referred to as CPU 205 herein), and a network interface 215. It is to be understood that the sensitivity control device 200 is provided by way of example only and that the sensitivity control device 200 can be implemented differently in other embodiments. For example, in other embodiments, some of the components shown in FIG. 2 can be omitted and/or other components can be included.

Each CPU 205 retrieves and executes programming instructions stored in the memory 225 and/or storage 230. The interconnect 220 is used to move data, such as programming instructions, between the CPU 205, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the sensitivity control device 200 via a communication network coupled to the network interface 215.

In some embodiments, the memory 225 stores instructions 210 and the storage 230 stores one or more vehicle profiles 209. The vehicle profiles 209 can be received over the network interface 215 or from a portable device communicatively coupled to the sensitivity control device 200 via the I/O device interface 250. As discussed above, each vehicle profile 209 includes data regarding responsiveness of the vehicle's actuators to control inputs. For example, the data can correlate the amount of user input with a response of the corresponding actuators for the vehicle corresponding to the vehicle profile, as discussed above. In other embodiments, the instructions 210 and the vehicle profiles 209 are stored partially in memory 225 and partially in storage 230, or they are stored entirely in memory 225 or entirely in storage 230, or they are accessed over a network via the network interface 215. Additionally, as discussed above, the vehicle profiles 209 can be stored in a database or memory device accessed via the network interface 215 rather than being locally attached or integrated with the sensitivity control device 200. Furthermore, as discussed above, the vehicle profiles 209 can include a vehicle profile created by the sensitivity control device 200 for the vehicle on which the sensitivity control device is located.

Figure 3:
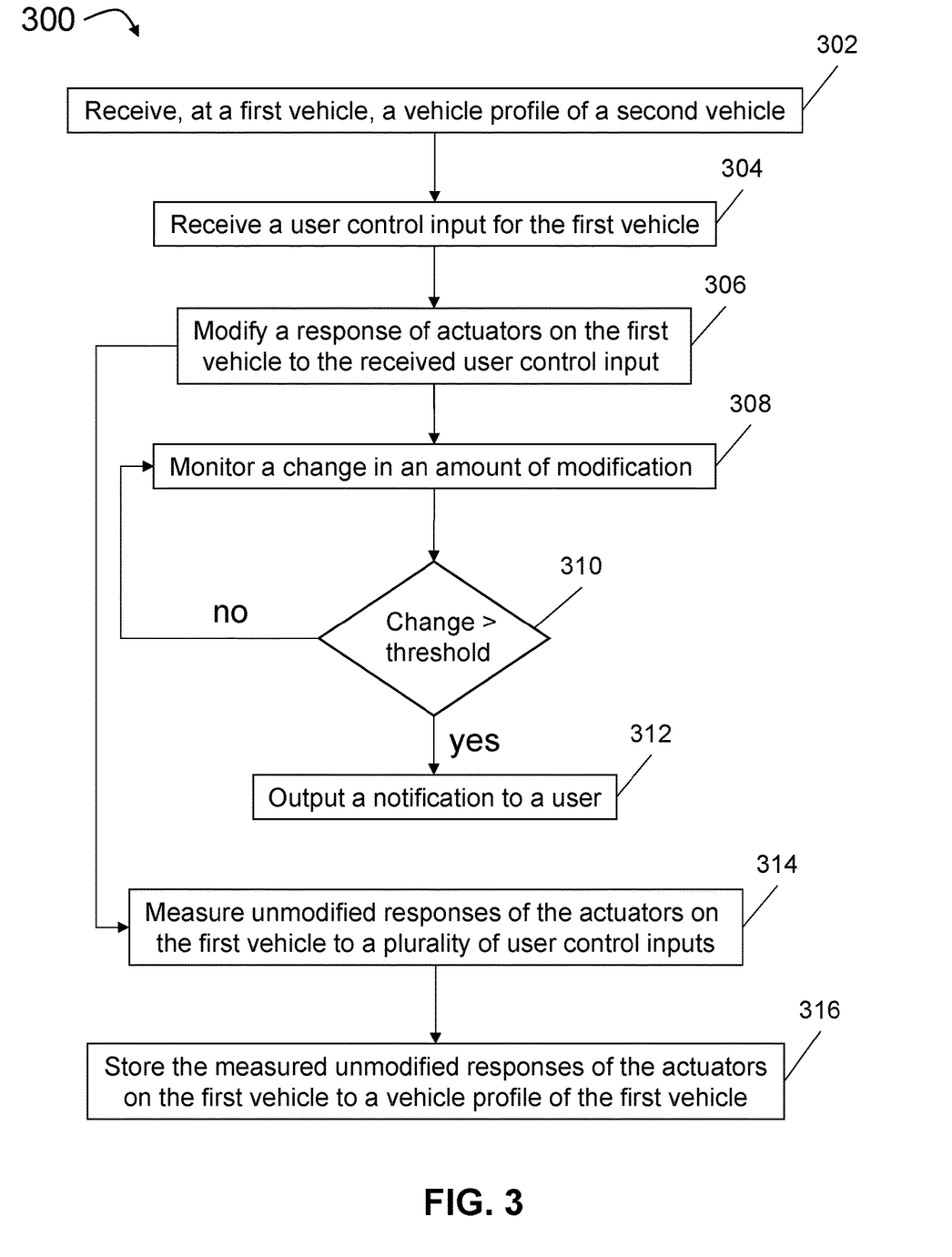
FIG. 3 is a flow chart depicting one embodiment of a method of adjusting sensitivity of a vehicle.

When executed, the instructions 210 cause the CPU 205 to determine a modification to actuators on the vehicle to approximate the response of a second different vehicle indicated by one of the vehicle profiles 209. The instructions 210 further cause the CPU 205 to output signals and commands via the I/O device interface 250 to the actuators, such as actuators 106, to control the responsiveness of the actuators to user control inputs received via the I/O device interface 250. The output signals and commands contain information related to modifying the responsiveness of the actuators. Thus, the CPU 205 is configured to output control signals to actuators on the same vehicle as the CPU 205 to cause the one or more actuators to respond to the received user input in a similar manner as one or more actuators on a second vehicle based on the received vehicle profile 209. Further details regarding operation of the sensitivity control device 200 are also described below with respect to method 300.

Furthermore, as discussed above, in some embodiments, one or more of the components and data shown in FIG. 2 include instructions or statements that execute on the processor 205 or instructions or statements that are interpreted by instructions or statements that execute on the processor 205 to carry out the functions as described herein. In other embodiments, one or more of the components shown in FIG. 2 are implemented in hardware via semiconductor devices, chips, logical gates, circuits, circuit cards, and/or other physical hardware devices in lieu of, or in addition to, a processor-based system.

FIG. 3 is a flow chart depicting one embodiment of an example method 300 of adjusting sensitivity of a vehicle. The method 300 can be implemented by a system, such as system 100 described above. For example, the method 300 can be implemented by a CPU, such as CPU 205 in sensitivity control device 200, executing instructions, such as instructions 210. It is to be understood that the order of actions in example method 300 is provided for purposes of explanation and that the method can be performed in a different order in other embodiments. Similarly, it is to be understood that some actions can be omitted or additional actions can be included in other embodiments. For example, blocks 308-312 which are directed to detecting maintenance needs can be omitted in some embodiments. Similarly, blocks 314-316 which are directed to creating a vehicle profile can be omitted in some embodiments.

At block 302, a vehicle profile of a second vehicle is received at a first vehicle. For example, as described above, the vehicle profile of the second vehicle can be received from a locally attached media storage device or over a network connection, such as over the internet. In addition, as discussed above, the vehicle profile of the second vehicle correlates measured responses of one or more actuators on the second vehicle to measured user control inputs on the second vehicle. In some embodiments, the second vehicle is a specific single vehicle. In other words, the correlation for measured responses of the actuators to user control inputs is for a single vehicle, such as another vehicle driven by the user of the first vehicle. In other embodiments, the second vehicle represents an average vehicle based on measured responses of actuators on each of a plurality of vehicles to corresponding measured user control inputs on each of the plurality of vehicles. In other words, the vehicle profile of the second vehicle in such embodiments is a crowdsourced vehicle profile as discussed above.

At block 304, a user control input for the first vehicle is received. For example, a user control input can be received from a steering wheel, a brake pedal, an acceleration pedal, a horn, etc. At block 306, a response of one or more actuators on the first vehicle to the received user control input is modified based on the received vehicle profile of the second vehicle such that the one or more actuators on the first vehicle mimic the one or more actuators on the second vehicle, as discussed above. In other words, the processor causes the actuators on the first vehicle to respond to the received user control input in similar manner to the actuators on the second vehicle. For example, pushing an acceleration pedal half way to the floor results in approximately the same acceleration in approximately the same amount of time on the first vehicle as on the second vehicle, in some embodiments. Similarly, pushing on a horn results in a same volume for the sound on both the first vehicle and the second vehicle. Modifying the response of the one or more actuators can include, in some embodiments, monitoring a response of the actuators to the user control input via sensors and adjusting the response until the monitored response matches the expected response from the second vehicle profile.

Furthermore, in some embodiments, the received vehicle profile is used to detect maintenance needs. In some such embodiments, the processor monitors a change in an amount of modification applied to the actuators of the first vehicle to mimic the actuators of the second vehicle, at block 308. At block 310, the processor compares the monitored change to a predetermined threshold. If it is determined that the change does not exceed the threshold, the method 300 can return to block 308. If it is determined that the change does exceed the threshold, a notification of the maintenance need is output to the user. For example, as described above, an audio notification and/or a visual notification can be output to the user at block 312, in some embodiments.

In addition, in some embodiments, the processor is configured to generate a vehicle profile for the first vehicle. In some such embodiments, the processor measures, via one or more sensors, unmodified responses of the actuators on the first vehicle to a plurality of user control inputs for the first vehicle, at block 314. For example, the unmodified responses can be measured prior to receiving the vehicle profile of the second vehicle in some embodiments. In other embodiments, the user can select to not use the vehicle profile of the second vehicle. Thus, the native/original responsiveness of the actuators on the first vehicle is used. In either way, the processor can monitor the unmodified or native responses of the actuators on the first vehicle. In addition, monitoring the unmodified responses can include monitoring road conditions (e.g. road incline, wet road, bumpy road, etc.) and weather conditions (e.g. temperature, rain, snow, etc.), in some embodiments.

At block 316, the measured unmodified responses are saved or stored in a vehicle profile for the first vehicle. Thus, the vehicle profile of the first vehicle correlates the native responsiveness of the actuators of the first vehicle to a plurality of user control inputs. In addition, in some embodiments, the stored vehicle profile for the first vehicle correlates the monitored road and/or weather conditions with the measured responses of the actuators and the measured user control inputs. Similarly, it is to be understood that the second vehicle profile can also include correlations with road and/or weather conditions. Additionally, as discussed above, the second vehicle profile can include data regarding the age and condition of the second vehicle.

Thus, the method 300 enables a first vehicle to mimic the responsiveness of a second different vehicle under different conditions (e.g. road and/or weather conditions) as discussed above. This enables a driver to more easily switch between vehicles and have an expected driving experience with little need to adapt to the responsiveness of a different vehicle. The method can also help in detecting maintenance and repair issues, as discussed above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
receiving, at a first vehicle currently driven by a user, a vehicle profile of a second vehicle via a network connection, wherein the second vehicle was previously driven by the user and the vehicle profile of the second vehicle correlates measured responses of one or more actuators on the second vehicle to measured user control inputs which are sensed using a plurality of sensors in the second vehicle;
receiving a user control input for the first vehicle;
modifying a response of one or more actuators on the first vehicle to the received user control input based on the received vehicle profile of the second vehicle such that the one or more actuators on the first vehicle respond to the received user control input in a same manner as the one or more actuators on the second vehicle;
monitoring a change in an amount of user physical input modification applied to the one or more actuators on the first vehicle to provide a same vehicle response as the one or more actuators on the second vehicle; and
outputting a visual maintenance notification to the user through a display of the first vehicle in response to the change in the amount of user physical input modification applied to the one or more actuators on the first vehicle exceeding a predetermined threshold,
wherein the one or more actuators on the first vehicle and the second vehicle include at least one of steering actuators, braking actuators, and acceleration actuators, and
the user is a licensed driver of the first vehicle and the second vehicle.

2. The computer-implemented method of claim 1, wherein the second vehicle represents an average vehicle based on measured responses of one or more actuators on each of a plurality of vehicles to corresponding measured user control inputs on each of the plurality of vehicles.

3. The computer-implemented method of claim 1, wherein the user owns the first vehicle and the second vehicle.

4. The computer-implemented method of claim 1, further comprising:

measuring unmodified responses of the one or more actuators on the first vehicle to a plurality of user control inputs for the first vehicle; and
storing the measured unmodified responses of the one or more actuators on the first vehicle to a vehicle profile of the first vehicle.

5. The computer-implemented method of claim 4, further comprising:
monitoring road conditions while measuring the unmodified responses;
monitoring weather conditions while measuring the unmodified responses; and
correlating the monitored road conditions and monitored weather conditions with the unmodified responses stored in the vehicle profile of the first vehicle.

6. The computer-implemented method of claim 1, further comprising outputting an audio maintenance notification to the user through a sound system of the first vehicle in response to the change in the amount of user physical input modification applied to the one or more actuators on the first vehicle exceeding a predetermined threshold.

7. The computer-implemented method of claim 1, wherein the user control input is received at the first vehicle via one of a steering wheel, a brake pedal, and an acceleration pedal.

8. A system comprising:
an interface on a first vehicle currently driven by a user and configured to receive a vehicle profile for a second vehicle which was previously driven by the user, wherein the vehicle profile correlates measured responses of one or more actuators on the second vehicle to measured user control inputs on the second vehicle;
one or more actuators on the first vehicle;
one or more user input devices configured to receive a user control input; and
a processor on the first vehicle, the processor communicatively coupled to the interface, to the one or more actuators and to the one or more user input devices, wherein the processor is configured to output a control signal to the one or more actuators on the first vehicle to cause the one or more actuators on the first vehicle to respond to the received user control input in a same manner as the one or more actuators on the second vehicle based on the received vehicle profile for the second vehicle, monitor a change in an amount of user physical input modification applied to the one or more actuators on the first vehicle to provide a same vehicle response as the one or more actuators on the second vehicle, output a visual maintenance notification to the user through a display of the first vehicle in response to the change in the amount of user physical input modification applied to the one or more actuators on the first vehicle exceeding a predetermined threshold,
wherein the one or more actuators on the first vehicle and the second vehicle include at least one of steering actuators, braking actuators, and acceleration actuators, and
the user is a licensed driver of the first vehicle and the second vehicle.

9. The system of claim 8, wherein the second vehicle represents an average vehicle based on measured responses of one or more actuators on each of a plurality of vehicles to corresponding measured user control inputs on each of the plurality of vehicles.

10. The system of claim 8, wherein the user owns the first vehicle and the second vehicle.

11. The system of claim 8, wherein the system further comprises one or more sensors configured to measure unmodified responses of the one or more actuators on the first vehicle to a plurality of user control inputs received at the first vehicle; and wherein the processor is configured to store the measured unmodified responses of the one or more actuators on the first vehicle to a vehicle profile of the first vehicle.

12. The system of claim 11, wherein the one or more sensors include:

at least one road sensor configured to monitor road conditions while the unmodified responses are measured; and at least one weather sensor configured to monitor weather conditions while the unmodified responses are measured;

wherein the processor is configured to correlate the monitored road conditions and monitored weather conditions with the unmodified responses stored in the vehicle profile of the first vehicle.

13. The computer-implemented method of claim 6, wherein the vehicle profile of the second vehicle is a crowdsourced vehicle profile.

14. The system of claim 8, wherein the one or more user input devices include at least one of a steering wheel, a brake pedal, and an acceleration pedal.

15. A computer program product comprising a computer readable storage medium having a computer readable program stored therein, wherein the computer readable program, when executed by a processor on a first vehicle, causes the processor to:

receive a vehicle profile of a second vehicle via a network connection, wherein the vehicle profile of the second vehicle which was previously driven by a user and correlates measured responses of one or more actuators on the second vehicle to measured user control inputs which are sensed using a plurality of sensors in the second vehicle;

receive a user control input for the first vehicle currently driven by the user; and modify a response of one or more actuators on the first vehicle to the received user control input based on the received vehicle profile of the second vehicle such that the one or more actuators on the first vehicle respond to the received user control input in a same manner as the one or more actuators on the second vehicle;

monitor a change in an amount of user physical input modification applied to the one or more actuators on the first vehicle to provide a same vehicle response as the one or more actuators on the second vehicle; and output a visual maintenance notification to the user through a display of the first vehicle in response to the change in the amount of user physical input modification applied to the one or more actuators on the first vehicle exceeding a predetermined threshold, wherein the one or more actuators on the first vehicle and the second vehicle include at least one of steering actuators, braking actuators, and acceleration actuators, the vehicle profile comprises a plurality of maintenance needs, and the user is a licensed driver of the first vehicle and the second vehicle.

16. The computer program product of claim 15, wherein the second vehicle represents an average vehicle based on measured responses of one or more actuators on each of a plurality of vehicles to corresponding measured user control inputs on each of the plurality of vehicles.

17. The computer program product of claim 15, wherein the user owns the first vehicle and the second vehicle.

18. The computer program product of claim 15, wherein the computer readable program is further configured to cause the processor to:

measure unmodified responses of the one or more actuators on the first vehicle to a plurality of user control inputs for the first vehicle; and store the measured unmodified responses of the one or more actuators on the first vehicle to a vehicle profile of the first vehicle.

19. The computer program product of claim 18, wherein the computer readableprogram is further configured to cause the processor to:

monitor road conditions while measuring the unmodified responses; monitor weather conditions while measuring the unmodified responses; and correlate the monitored road conditions and monitored weather conditions with the unmodified responses stored in the vehicle profile of the first vehicle.

20. The computer-implemented method of claim 13, wherein the vehicle profile of the second vehicle includes an algorithm which correlates the measured responses of the one or more actuators on the second vehicle to the measured user control inputs which are sensed using the plurality of sensors in the second vehicle.

* * * * *